(12) United States Patent
Pulkkinen et al.

(10) Patent No.: US 12,273,651 B2
(45) Date of Patent: *Apr. 8, 2025

(54) SYSTEM AND METHOD FOR REMOTE ACTIVATION OF A STORAGE OPERATION OF PICTORIAL INFORMATION

(71) Applicant: Suunto Oy, Vantaa (FI)

(72) Inventors: Ewa Pulkkinen, Vantaa (FI); Björn Bornemann, Vantaa (FI); Teemu Maikkola, Vantaa (FI); Maria Pekkarinen, Vantaa (FI); Michael Miettinen, Vantaa (FI); Mikko Ahlström, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 437 days.

This patent is subject to a terminal disclaimer.

(21) Appl. No.: 16/956,856

(22) PCT Filed: Dec. 21, 2018

(86) PCT No.: PCT/FI2018/050973
§ 371 (c)(1),
(2) Date: Jun. 22, 2020

(87) PCT Pub. No.: WO2019/122535
PCT Pub. Date: Jun. 27, 2019

(65) Prior Publication Data
US 2021/0058581 A1    Feb. 25, 2021

Related U.S. Application Data

(63) Continuation of application No. 15/851,778, filed on Dec. 22, 2017, now Pat. No. 10,362,263, which is a
(Continued)

(30) Foreign Application Priority Data

Jul. 2, 2014    (FI) ...................................... 20145643

(51) Int. Cl.
*H04N 5/907* (2006.01)
*G06F 3/01* (2006.01)
(Continued)

(52) U.S. Cl.
CPC ............. *H04N 5/907* (2013.01); *G06F 3/011* (2013.01); *G06F 3/017* (2013.01); *G11B 19/027* (2013.01);
(Continued)

(58) Field of Classification Search
CPC .......... H04N 5/907; H04N 5/765; H04N 5/77; H04N 5/232; G06F 3/011; G06F 3/017; G11B 19/027; G11B 19/06
(Continued)

(56) References Cited

U.S. PATENT DOCUMENTS 6,359,837 B1    3/2002    Tsukamoto
8,214,139 B2    7/2012    Yonker et al.
(Continued)

FOREIGN PATENT DOCUMENTS

CN    101682694 A    3/2010
CN    102866802 A    1/2013
(Continued)

OTHER PUBLICATIONS

Innovasub: DivePhone: A Promising Technology. Dive Matrix, Feb. 23, 2012.
(Continued)

*Primary Examiner* — Thai Q Tran
*Assistant Examiner* — Stephen R Smith
(74) *Attorney, Agent, or Firm* — Laine IP Oy

(57) ABSTRACT

The invention relates to a system and method for remote activation of a storage operation of pictorial information. According to the invention, it involves a wearable sensor device, comprising at least one sensor providing sensor
(Continued)

signals, a processing unit for running computer programs, a first memory unit for storing instructions for said computer programs and a wireless signaling unit for communicating with external devices over a wireless link. The system further comprises at least one second digital device comprising a recording apparatus adapted to be set in a mode of continuous capture of pictorial information, a second memory unit, and a wireless signaling system for communicating with external devices over a wireless link. The processing unit in the wearable sensor device is adapted to send commands over said wireless link by means of one-way transmission to said second digital device to trigger, in response to said commands, storage of at least part of said continuously captured pictorial information in the memory of said at least one second device.

23 Claims, 4 Drawing Sheets

Related U.S. Application Data continuation-in-part of application No. 14/328,763, filed on Jul. 11, 2014, now Pat. No. 9,883,134.

(51) Int. Cl.
- G11B 19/02 (2006.01)
- H04N 5/765 (2006.01)
- H04N 5/77 (2006.01)
- H04N 23/60 (2023.01)
- G11B 19/06 (2006.01)

(52) U.S. Cl.
CPC ............. H04N 5/765 (2013.01); H04N 5/77 (2013.01); H04N 23/60 (2023.01); G11B 19/06 (2013.01)

(58) Field of Classification Search
USPC ....... 386/228; 348/143; 340/87.02; 702/127; 600/547
See application file for complete search history.

(56) References Cited

U.S. PATENT DOCUMENTS

| | | | |
|---|---|---|---|
| 8,467,270 B2 | 6/2013 | Gossweiler, III et al. | |
| 8,613,937 B2 | 12/2013 | Boyden et al. | |
| 9,170,674 B2 | 10/2015 | Forutanpour et al. | |
| 2002/0081976 A1* | 6/2002 | Fujisawa | G04G 21/04 455/88 |
| 2005/0111036 A1 | 5/2005 | Takasaki et al. | |
| 2007/0104476 A1 | 5/2007 | Yasutomi et al. | |
| 2007/0156369 A1* | 7/2007 | Alexander | G01P 15/0891 702/127 |
| 2008/0298796 A1* | 12/2008 | Kuberka | H04N 5/23206 396/263 |
| 2012/0316456 A1* | 12/2012 | Rahman | G06F 3/0346 600/300 |
| 2013/0176142 A1* | 7/2013 | Drysdale | G16H 20/30 340/870.02 |
| 2013/0235222 A1 | 9/2013 | Karn et al. | |
| 2013/0250134 A1 | 9/2013 | McCauley | |
| 2013/0271602 A1* | 10/2013 | Bentley | G06V 40/25 348/143 |
| 2013/0330054 A1 | 12/2013 | Lokshin | |
| 2013/0343729 A1 | 12/2013 | Rav-Acha et al. | |
| 2014/0036088 A1 | 2/2014 | Gabriel | |
| 2014/0058546 A1 | 2/2014 | Vock et al. | |
| 2014/0104447 A1 | 4/2014 | Woodman | |
| 2014/0176775 A1 | 6/2014 | Ichikawa et al. | |
| 2015/0055931 A1* | 2/2015 | Koivukangas | H04N 5/772 386/228 |
| 2015/0187206 A1 | 7/2015 | Saurin et al. | |
| 2015/0256689 A1* | 9/2015 | Erkkila | H04N 9/8045 386/228 |
| 2015/0332004 A1 | 11/2015 | Najafi et al. | |
| 2016/0006974 A1 | 1/2016 | Pulkkinen et al. | |
| 2016/0241768 A1* | 8/2016 | Lokshin | H04N 5/23296 |
| 2017/0133051 A1 | 5/2017 | Mack et al. | |
| 2017/0336858 A1 | 11/2017 | Lee et al. | |

FOREIGN PATENT DOCUMENTS

| | | |
|---|---|---|
| CN | 103076884 A | 5/2013 |
| CN | 104685322 A | 6/2015 |
| GB | 2527855 A | 1/2016 |
| GB | 2561498 A | 10/2018 |
| GB | 2561995 A | 10/2018 |
| WO | WO2013076720 A1 | 5/2013 |

OTHER PUBLICATIONS

PebbleSnap: Announcing Pebble Snap 2.1, Feb. 28, 2014.
Rainmaker: Garmin VIRB & VIRB Elite In-depth Review. Dec. 19, 2013.

* cited by examiner

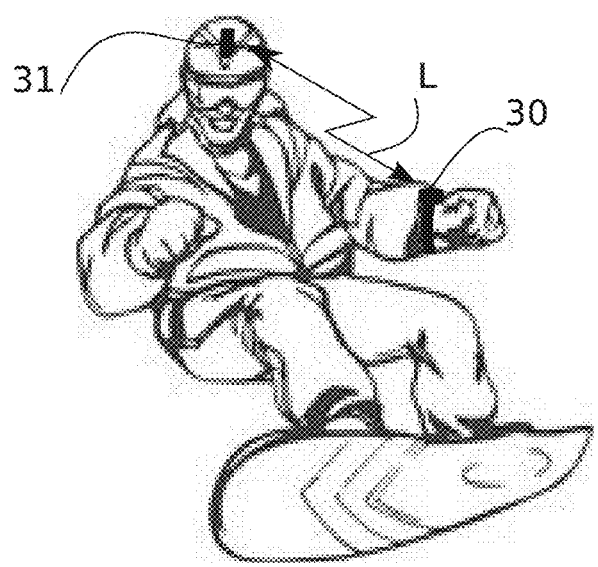
Fig. 3
Fig. 4
| T1 | T2 | T3 | T4 | T5 | T6 |
|---|---|---|---|---|---|
| VC1 | VC2 | VC3 | VC4 | VC5 | VC6 |
Fig. 5

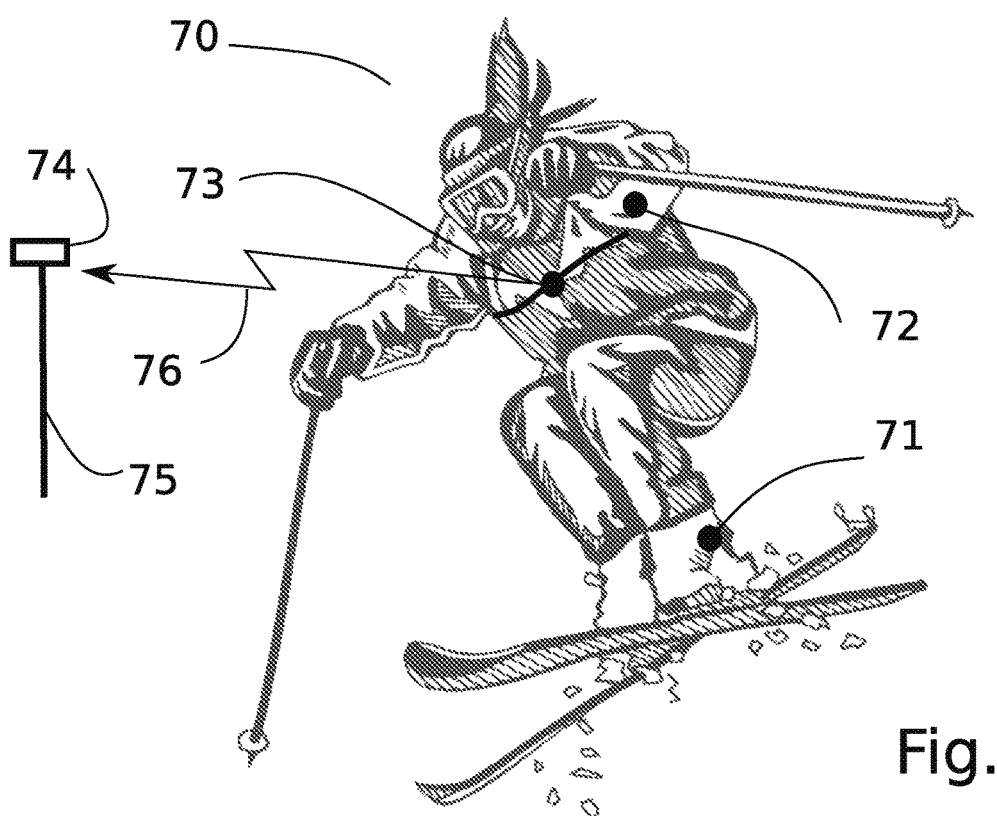
Fig. 7
Fig. 8
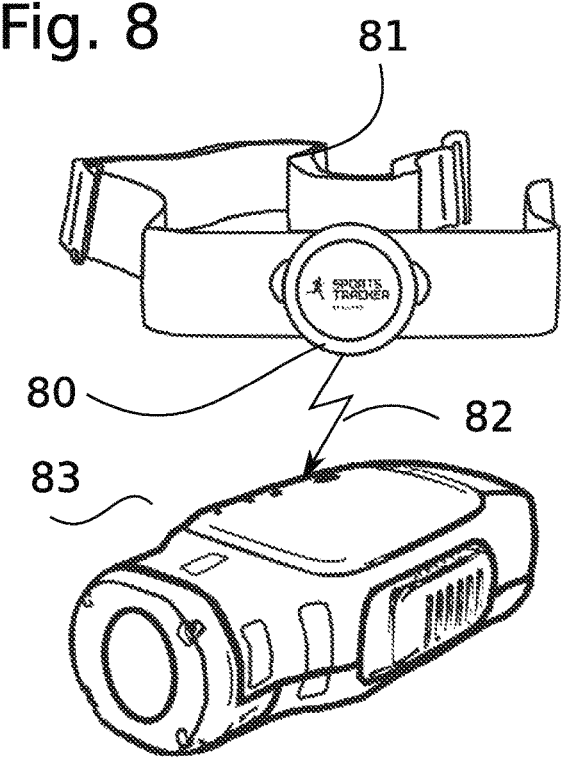
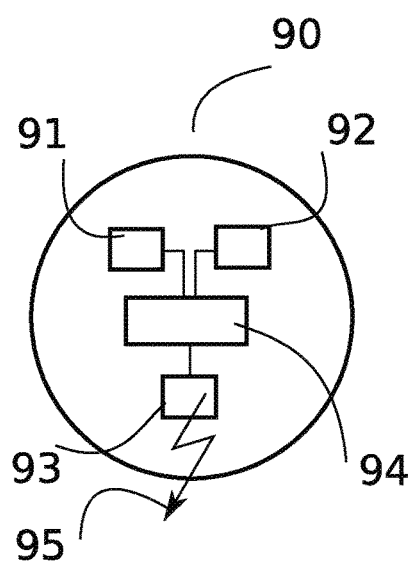
Fig. 9

SYSTEM AND METHOD FOR REMOTE ACTIVATION OF A STORAGE OPERATION OF PICTORIAL INFORMATION

BACKGROUND OF THE INVENTION

Field of the Invention

The invention relates to a system and method for remote activation of a storage operation of pictorial information.

More specifically, the invention relates to personal wearable and sports devices, where the user wants to capture pictorial information in form of video footage of performances and situations, and store them for later viewing, editing and sharing.

Description of Related Art

Various approaches to the problem of recording, editing, viewing and sharing of video information with personal devices are known. One such approach is presented in U.S. Pat. No. 8,613,937, where management of broadcasted and received video information with a mobile device is discussed. The content is not produced or edited by the user in any way, but filtering and bookkeeping features are offered for the content as such.

Another approach is shown in U.S. Pat. No. 8,214,139, where a navigation device may be configured to trigger various actions based on GPS positioning, an identified position change or acceleration. Such recording devices are however triggered by position data only, and the length of the footage is determined by external conditions.

Another approach is shown in US Patent Application 2013/0343729, where a system for semi-automated video editing is discussed. The system is based on an algorithm for evaluation and classification of offered video content, giving as a result a compiled and edited version of the input material where selected sequences of the original video material is included based on action, facial expressions etc.

In sports and outdoor activities, it would often be desirable to collect memories in the form of video footage during a performance or a mountain trip, for example. There is no lack of cameras to take such footage with, including the ones built-in into smartphone and PDA's. Editing such video material afterwards is time consuming and cumbersome. Also during training, it would be important for the trainee and/or the trainer to record certain sequences, perhaps taken a multitude of times, of the performance for later analysis. Long video sequences does not lend themselves easily to spot, isolate and view critical performance steps, the duration of which may be only a fraction of a second.

Thus there is a need for a system which is able to take video clips only when needed without a great deal of effort from the user and without having to hold the camera in place. It is also a requirement to keep the necessary editing at a minimum, whereby the video clips must be of a length and having a timeline around the triggering event that is known in advance, rendering them easy to scan through in order to accept or reject.

SUMMARY OF THE INVENTION

It is thus an object of the present invention to present a solution to the problems identified above, offering a solution based on two separate devices with a wireless connection between them, and on sensors connected to one or both of the devices. The inventive system, method and devices offer an efficient solution for collecting only relevant video footage around triggered events along an exercise or trip of any kind. The so collected video clips are easy to chain together to tell a "full" story, or to just browse through to select the most appropriate ones for immediate sharing over a network or for editing.

According to a first aspect of the invention, the inventive system for remote activation of a storage operation of pictorial information comprises a wearable sensor device, comprising at least one sensor providing sensor signals, a processing unit for running computer programs, a first memory unit for storing instructions for said computer programs and a wireless signaling unit for communicating with external devices over a wireless link. It also comprise at least one second digital device comprising a recording apparatus adapted to be set in a mode of continuous capture of pictorial information, a second memory unit, and a wireless signaling system for communicating with external devices over a wireless link.

The processing unit in the wearable sensor device is adapted, based on said sensor signals, to send commands over said wireless link by means of one-way transmission to said second digital device to trigger, in response to said commands, storage of at least part of said continuously captured pictorial information in the memory of said at least one second device.

It is to be understood that the commands may be generated by any means where a sensor is detecting a desired trigger event for storage of pictorial information. Such sensors included in the device may track movements by means of measuring acceleration, directions by means of a magnetometer, location by means of a GPS sensor, the height or changes in height by means of an air pressure sensor, etc. The sensor device may also have a timer function. Naturally, the location of the sensor device may be selected according to the sports discipline or other movements during the performance that will initiate the desired commands to be sent over wireless link The sensor device may be a sensor module that is detachably attached to an apparel or equipment of a user, integrated in a garment worn by the user, integrated in a shoe or other sport equipment of the user.

The second device may be one or several wearable digital cameras, or a smartphone equipped with at least one digital camera, for example.

In some embodiments, the second device is adapted to store captured pictorial information as video clips in its memory a predetermined period of time before and/or after having received a storage command.

In some embodiments, the sensor device has a programming interface, which enables a connection to an external computerized device. The external device, which may be a mobile phone, a wristop computer (smartwatch) or a tabletop computer, has a user interface for adding and/or modification of computer program instructions and/or parameters for the wearable sensor device. The edited or added instructions and/or parameters are then stored in the first memory unit.

In some embodiments, the external computerized device comprising the programming interface may be the same second digital device that comprises the recording apparatus. In such a case, the external computerized device may be a wearable digital camera or a mobile phone.

In some embodiments, the wearable sensor device comprises at least a 3D accelerometer sensor, and/or electromagnetic sensors for 3D-detection of the direction of earth's magnetic field.

The terms first memory unit and second memory units are not to be interpreted only as single memory circuits. One or both of these memory units may instead be an interchangeable memory card, such as an SD-card, for example. A first and/or second memory unit may also be a separately addressable part, file or area in a larger memory space.

According to a second aspect of the invention, a method of activating a storage operation of pictorial information is provided, including the steps of:

providing a wearable sensor device comprising at least one sensor providing sensor signals, a processing unit for running computer programs, a first memory unit for storing instructions for said computer programs and a wireless signaling unit for communicating with external devices over a wireless link;

providing at least one second digital device comprising a recording apparatus adapted to be set to continuous capture of pictorial information, a second memory unit, and a wireless signaling system for communicating with external devices over a wireless link;

producing in said wearable device, based on said sensor signals, commands to instruct storage of pictorial information in said second device;

transmitting by means of one-way transmission said commands over said wireless link to said second device;

receiving said commands in said at least one second device and triggering in response to said commands storage of at least part of said continuously captured pictorial information in a memory of said at least one second device.

The inventive method may comprise a further step of storing in said at least one second device captured pictorial information as video clips of a predetermined length, wherein each clip is captured a predetermined period of time before and/or after a storage command was issued.

The inventive method may comprise a still further step of adding and/or modifying computer program instructions and/or parameters through a programming interface in said sensor device with a an external computerized device having a user interface for said wearable sensor device, and storing said instructions and/or parameters in said first memory unit.

The invention brings considerable advantages as an efficient solution for collecting only relevant video footage around triggered events along an exercise or trip of any kind. The collected video clips are chained together and tells as such the "full" story of the event, but it is also very easy to browse through them to select the most appropriate clip(s) e.g. for immediate sharing over a network, or for editing.

With the aid of the present invention, the user need to spend less time editing footage, capture the moments he or she wants to save. The inventive concept also saves memory on memory cards typically used in digital cameras. Using pre-created or own-made applications for managing the recording of footage, the user itself can define conditions for which the recording will take place.

It is an essential feature of the present invention that the recording apparatus adapted to be in a mode of continuous capture of pictorial information. When the camera is set on, it will capture and keep a certain amount of video footage in memory where new footage erases the older, as in an endless tape recording. Only when a command is issued to initiate storage of the captured pictorial information, it will be permanently stored in the memory of the camera. This facilitates storage of video material which was captured immediately before the storage command was issued, as well as after the command. The recording period, which obviously can be set by the user and heavily depends on the nature of the event, may use all time of the period to store the video signal up to the storage command was issued, the recording period may center around the storage command, the period may start with the storage command, or any combination thereof.

For the purposes of this description and in this context, the words "recording" and "capture" are used as synonyms describing the process of recording video footage at least temporarily in a recording device that is set to be in a continuous recording mode. The word "store" and all its derivatives including "storage" are used for video footage or video clips that is actually stored permanently for later viewing, editing and/or sharing.

The wireless communication system providing wireless link may be based on radio technologies like Bluetooth or RFID, or any short-range communication system.

BRIEF DESCRIPTION OF THE DRAWINGS

FIG. 3 shows an example of the inventive system when it is carried by the user;

FIG. 4 shows an example of the inventive system where one component of the system is stationary;

FIG. 5 shows a schematic representation of video clips recorded according to the present invention;

FIG. 7 shows a further example of the inventive system when it is carried by the user;

FIG. 8 shows the main components of the inventive system; and

FIG. 9 shows a sensor unit suitable for use in the inventive system in more detail.

DETAILED DESCRIPTION OF THE INVENTION

Figure 1:
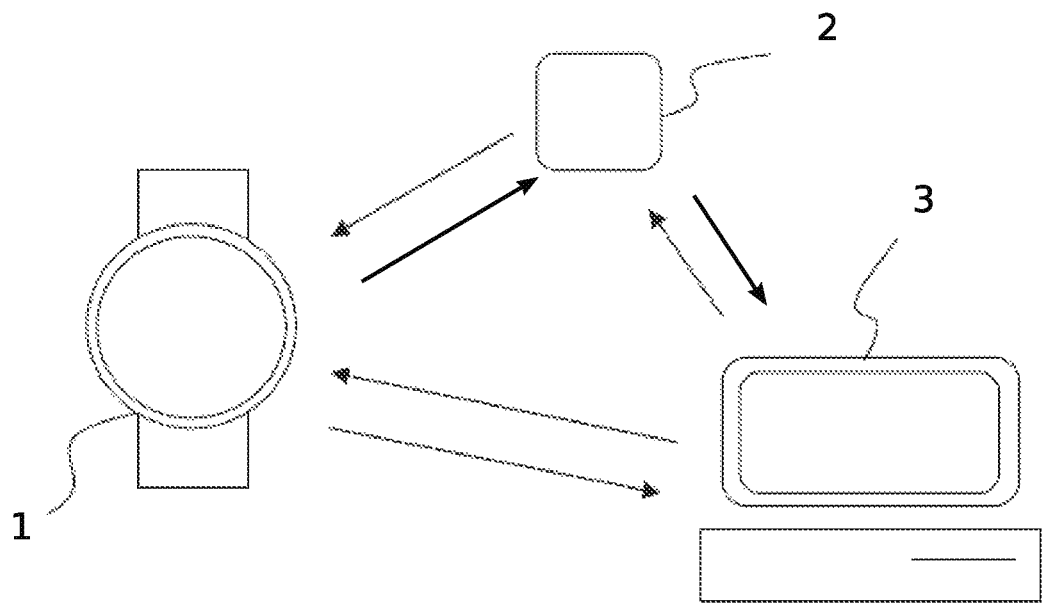
FIG. 1 shows the main components of the inventive system.

In FIG. 1 is shown the main components of one embodiment of the inventive system: a wearable sensor device 1, a unit 2 containing a video camera and external computerized device 3. All the connections between the devices need not to be two-way communications. The wearable sensor device 1 is only sending commands to the camera unit 2, not receiving anything from it.

The general-purpose computer, or a service accessed with it from the internet, may provide a programming interface for the wearable sensor device 1. Apart from obvious configuration data input needs, an important task for the programming interface in the computerized device 3 or the camera unit 2, in some embodiments and if so equipped, is to allow for input, setting or editing of computer program instructions and/or parameters for the various applications running in the wearable sensor device. These applications depend on the sensors available and the needs of the user, and the parameters may typically be sensor value trigger levels for activation of the camera unit 2, video clip recording times, and so on.

It is clear that a two-way communication between the computerized device 3 and the wearable sensor device 1 facilitates the use of a programming interface on the computerized system 3 that may be used for editing of predefined applications running in the wearable sensor device 1, or for adding new ones. It is also within the scope of the present invention to store the data and customized views in a format that is transferable as data files to other similar devices or social media, or to remote services e.g. on the internet for bookkeeping and further processing.

Figure 2:
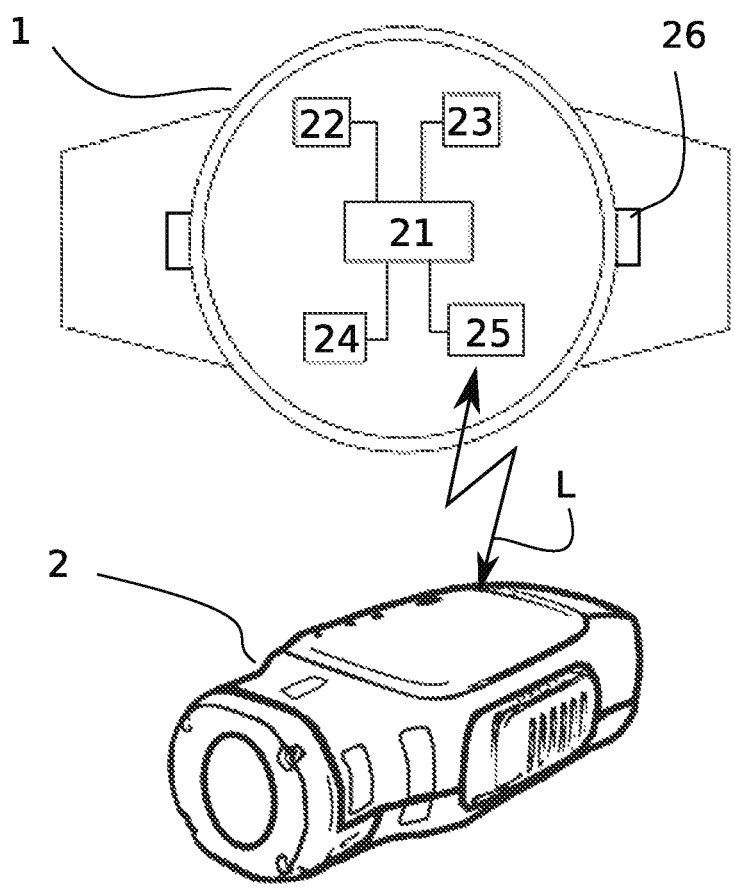
FIG. 2 shows a wristop computer and a camera unit according to the invention in more detail.

In FIG. 2 is shown a wearable sensor device 1 and a camera unit 2 in more detail. The wearable sensor device computer 1 has a processing unit 21 for running computer programs and applications. A user interface unit 22 may receive manual commands (on/off, start, reset, etc.) entered by the user e.g. by push-buttons 26. A first memory unit 23 is provided for storing operating systems, application program code and instructions and parameters. A sensor interface 24 provides a wired connection to one or more built-in sensors (not shown). Typically, the sensors may be accelerometers, gyroscopes or other orientation-detecting switches such as a compass, timers, GPS-devices, shock sensors, inclinometers and so forth.

A wireless signaling unit 25 is used for a one-way communication of commands to the camera unit 2 over a wireless link, as shown by the arrow L. The commands trigger storage of at least part of continuously captured pictorial information in a second memory unit of the camera unit 2.

The wireless communication protocol may be a Bluetooth LE or the proprietary ANT+ protocol. These are using direct-sequence spread spectrum (DSSS) modulation techniques and an adaptive isochronous network configuration, respectively. Enabling descriptions of necessary hardware for various implementations for wireless links are available e.g. from the Texas Instrument®'s handbook "Wireless Connectivity" which includes IC circuits and related hardware configurations for protocols working in sub-1- and 2.4-GHz frequency bands, such as ANTI™, Bluetooth®, Bluetooth low energy, RFID/NFC, PurePath™ Wireless audio, ZigBee®, IEEE 802.15.4, ZigBee RF4CE, 6LoW-PAN, Wi-Fi®, GPS.

The wireless signaling unit 25 may also provide a programming interface enabling a two-way connection to the external computerized device 3, which has a user interface for adding and/or modification of computer program instructions and/or parameters for said wearable sensor device, as described above. The instructions and/or parameters are stored in the first memory unit 23. The camera device 2 may have the required programming interface in-built, which may be used by a wired or a wireless connection with the wearable sensor device 1.

In FIG. 3 is shown a man on a snowboard with a wearable sensor device 30 attached to his wrist and a camera 31 attached to his forehead by some suitable fastening means. Obviously, the camera may be attached to any part of the clothing, or to the snowboard. The wireless link L provides for wireless communication from device 30 to 31. The wearable sensor device 30 will send instructions to the camera 31 to start the storage of video clips when the ground speed, the vertical speed or acceleration (on a steep slope) exceeds a certain limit, or the gravity (lack of vertical acceleration) is zero or below a certain limit, indicating that the snowboarder makes a jump in the air. The trigger function may be based on any physical variable the sensors may detect, and the trigger rules may be built by an editing function to consider any combination of such variables, as will be explained later in the examples. Design and editing software for the triggers are as such known in the art and are, for example, stored in the external computerized device 3 as shown in FIG. 1, or in a camera unit 2, such as a mobile phone provided with a camera and a programming interface application for the wearable sensor device 30.

During the performance, the camera 31 interprets received command signals and the storage of pictorial information is initiated.

In FIG. 4 is shown the use of the present inventive system in a downhill ski-related embodiment, where the camera 41 is stationary, and the wearable sensor device 40 attached to the wrist (or elsewhere) of a user is operated to activate the camera 41 via the wireless link L to store a clip when the user approaches or passes across the line-of-sight of the camera. In this way, repetitive footage can be taken e.g. for training and comparison purposes. It is clear that within the scope of the invention, any number of cameras can be placed at a distance from each other or at different angles with respect to a performance spot or along a route. The triggering of the cameras may be manual or automatic, using e.g. proximity sensing. The conditions at some spots of performance, like at a take-off ramp, easily create conditions that can make the sensors in the wearable sensor device 41 to trigger the camera to store the event. Other performance spots to be monitored, e.g. on board of a sailing ship, are more likely to be manually or proximity triggered.

FIG. 5 is a schematic and exemplary representation of video clips VC1 . . . VC6 stored in a semiconductor or magnetic memory. Thumbnail icons T1-T6 showing the content of each of the video clips may be looked at for immediate decision on how to deal with each of the clips. Of course, a variety of editing technologies exist and it is not in the scope of the present invention to deal with the art of managing video clips in detail.

Figure 6:
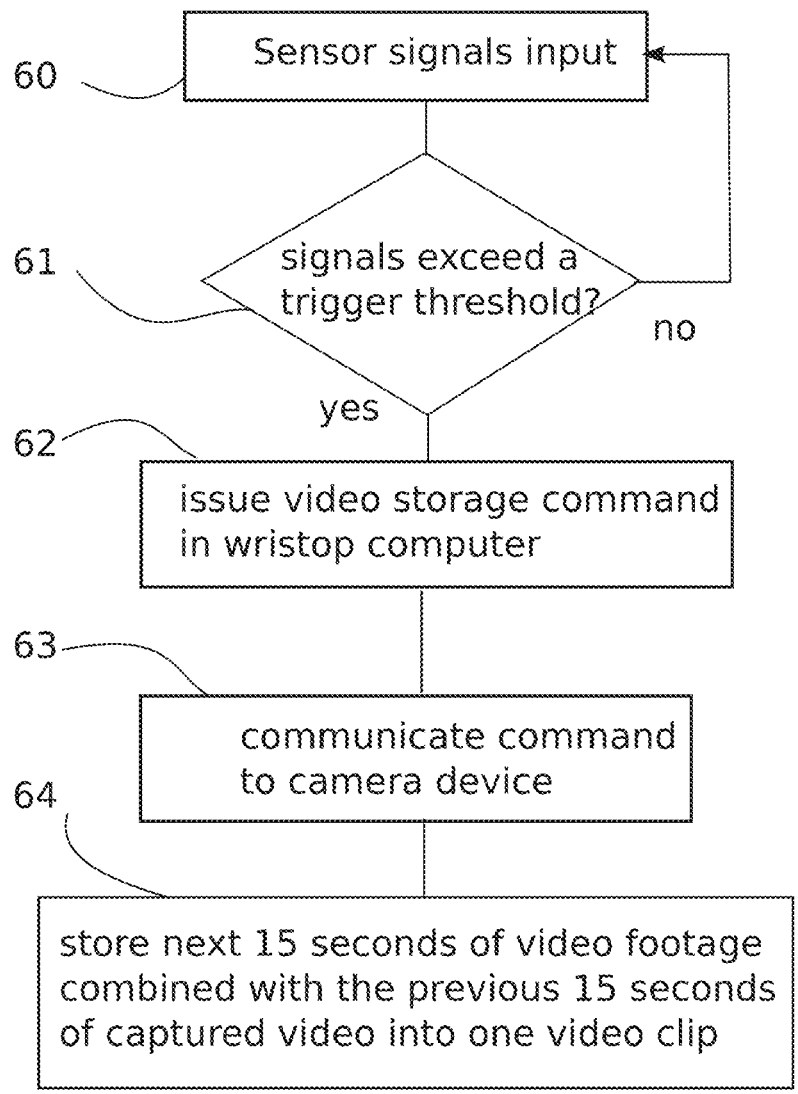
FIG. 6 shows a flowchart diagram over a video clip storage procedure according to the invention.

FIG. 6 shows a flowchart diagram over the basic video clip storage procedure according to the invention. In step 60, the wearable sensor device 1 of FIG. 2 is monitoring the sensor signals. If the input signals at test 61 exceed the pre-set trigger threshold for start storing video footage, a command to this effect is issued in 62 and communicated in step 63 to the camera unit 2. The camera unit in this example, records the next 15 seconds of video footage, and stores it with the previous 15 seconds of captured video in one video clip, as those shown in FIG. 5. Obviously and equally well, the whole length of the clip could be stored from video material captured before the command, and stop at the command. Vice versa, the whole length of the clip could be stored from video material captured after the command and stopped after a predetermined time.

EXAMPLES

1. Ski Stunts

A user wants to record his greatest jumps/stunts. After each successful jump, when a button 26 is pressed, 30 seconds of recorded video footage preceding the pressing of the button is stored. User can pre-define the length of stored footage.

```
//if user is on moving and in free fall for longer that 2 seconds: record a
movie clip 30 sec before and 30 after.
if (SUUNTO_SPEED > 10 && SUUNTO_G[2] < 1) {
ACTIVATE.CAMERA_AFTERTHOUGHT(30);
clipsrecorded = clipsrecorded+1;
//show how many clips have been recorded
RESULT = clipsrecorded;
}
```

2. Using a Stationary and a Moving Device

Here, a user wants to get short clips without the need/possibility to manipulate the wearable sensor device on the go. Proximity determination can be based on signal strength sensing, or it can be location-based using GPS. For example, the Bluetooth Low Energy (BLE) standard features proximity sensing. Other signal strength based options include ultrasound sensing e.g. in underwater applications or short-range inductive wireless (telemetric) devices. In location based proximity sensing, both the wearable sensor device and the camera may have GPS capabilities, or only the device on the move, provided that the position of the stationary device is fed into the GPS navigator.

Snowboarding with a helmet mounted camera, divers passing a stationary camera, sailing boats passing a turning point buoy are examples of useful applications in this regard. Filming a skateboarding trick with a camera mounted in the rail is also feasible, e.g. by using the following code:

```
//If user is approaching the camera start filming.
if(SUUNTO_PROXIMITY < 15 && recording == 0){
ACTIVATE.CAMERA_RECORD( );
   recording = 1;
//when user is gone, stop recording
}else if (SUUNTO_PROXIMITY >15 && recording == 1){
ACTIVATE.CAMERA_STOP( );
recording = 0;
}
```

3. Mountain Biking

User wants to film the downhill trails (maintaining a high speed) of a mountain bike expedition. He wants to automatically control the camera when hands can't be removed from the handlebar.

```
   if (SUUNTO_SPEED > 30 && recording == 0) {
ACTIVATE.CAMERA_RECORD( );
   recording = 1;
}else if (SUUNTO_SPEED < 20 && recording == 1){
ACTIVATE.CAMERA_STOP( );
   recording = 0;
}
```

During such a trail, the user likely wants to record the best views, spots, jumps etc. Here the buttons of the wearable sensor device can be used to bookmark the spots for future editing. The bookmarks can be saved to camera memory as short clips, to allow faster editing.

With reference to FIGS. 7-9, an further embodiments of the inventive system and method for remote activation of a storage operation of pictorial information is shown and described herein as follows:

The inventive system as used by a person 70 in FIG. 7 comprise wearable sensor devices 71, 72 and/or 73, which can be integrated in the equipment, like in a shoe (sensor 71), a garment (sensor 72), or worn detachably on the body (sensor 73), or simply in a pocket (not shown). If a sensor 71-73 includes acceleration sensors, its location on the person or the sports equipment may preferably be selected according to the sports discipline or other movements during the performance that will initiate the desired commands to be sent over wireless link 76 to a digital recording device, here depicted as a smart phone 74 rigged onto a stick 75. In response to such commands, the camera in the device 74 will be triggered to store in its memory (a second memory unit) a predefined part of the continuously captured pictorial information. Obviously, a camera 74 can also be carried on the person 70, as shown in FIG. 3.

The sensor device 71-73 comprises at least one sensor. The sensors included in the device may track movements by means of measuring acceleration, directions by means of a magnetometer, location by means of a GPS sensor, the height or changes in height by means of an air pressure sensor, etc. The sensor device may also have a timer function that may send out one or intermittently several commands at predetermined time(s), or it may delay the sending of a command with a predetermined time delay after the triggering event has occurred, for example.

The receiving device 74 may perform further calculations based on the received commands over the wireless link. If commands are sent out in a sequence, e.g. based on a timed function or asynchronously as sequential triggering events occur, the receiving device may measure the received signal strength and start the storage of the continuously captured pictorial information when the signal strength reaches a predefined threshold level, for example. Similar location-based calculations can be made based on a GPS sensor that is set to send a command when reaching a particular location, for example.

As explained in connection with FIG. 1, a programming interface on a separate computerized system, or in-built in the camera 74, may be used for editing of applications running in the wearable sensor device 74. Such a programming interface is for example a software having capability of controlling a wired or wireless interface 25, 93 of the wearable sensor device, to access the first memory unit (items 23 and 92 in FIGS. 2 and 9, respectively) in the wearable sensor device and to store the additions/changes made in that first memory unit.

With reference to FIG. 8, the inventive system shown comprises a wearable sensor device 80, here attached to a chest belt 81, a one-way wireless link 82 and a recording device 83.

The sensor device is now described in more detail in connection with FIG. 9. The sensor device 90 comprises at least one sensor 91, a processing unit 94 for running computer programs, a first memory unit 92 for storing instructions for the computer programs, and a wireless signaling unit 93 for communicating with external devices over a one-way wireless link 95. The processing unit 94 is adapted, based on sensor signals received from the sensor(s) 91, to send commands over the wireless link 95 to a second digital device 74, 83 to trigger, in response to said commands, storage of at least part of the continuously captured pictorial information in a memory of the second digital device.

According to some embodiments, the sensor device is a sensor module that is detachably attached to an apparel or equipment of a user. According to some embodiments, the sensor device is a sensor module that is integrated in a garment worn by the user. According to some further embodiments, the sensor device is a sensor module that is integrated in a shoe of the user. According to some embodiments, the sensor device may also be a sensor module that is integrated in sports equipment used by the user.

The second digital device is according to some embodiments a wearable digital camera 83. According to some embodiments, the second digital device is a smartphone 74 equipped with at least one digital camera. According to some embodiments, the second device may more than one digital camera.

According to the invention, the second digital device may be adapted to store captured pictorial information as video clips in its memory a predetermined period of time before and/or after having received a storage command, as explained in connection with FIG. 6.

According to the inventive method, the activation of a storage operation of pictorial information includes the steps of:

> providing a wearable sensor device 71-73; 80; 90 comprising at least one sensor 91 providing sensor signals, a processing unit 94 for running computer programs, a first memory unit 92 for storing instructions for said computer programs and a wireless signaling unit 93 for communicating with external devices 74, 83 over a wireless link 76, 82, 95;
>
> providing at least one second digital device 74, 83 comprising a recording apparatus adapted to be set to continuous capture of pictorial information, a second memory unit, and a wireless signaling system for communicating with external devices over a wireless link;
>
> producing in said wearable sensor device 71-73; 80; 90, based on said sensor signals, commands to instruct storage of pictorial information in said second device 74, 83;
>
> transmitting by means of one-way transmission of information said commands over said wireless link 76, 82, 95 to said second device;
>
> receiving said commands in said at least one second device 74, 83 and triggering in response to said commands storage of at least part of said continuously captured pictorial information in a memory of said at least one second device.

The second digital recording device 74, 83 is here by default presumed to have a second memory unit to capture, and when so instructed, to store selected pictorial information in a predetermined way, for example as clips as discussed in connection with FIGS. 5 and 6. The captured pictorial information may thus be stored as video clips of a predetermined length. Each clip may thus be captured a predetermined period of time before and/or after a storage command was issued.

It is to be understood that the embodiments of the invention disclosed are not limited to the particular systems and process steps disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. Numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for remote activation of a storage operation of pictorial information, comprising:

> a wearable sensor device, comprising at least one sensor providing sensor signals, a processing unit for running computer programs, a first memory unit for storing instructions for said computer programs and a wireless signaling unit for communicating with external devices over a wireless link; and
>
> at least one second digital device comprising a recording apparatus adapted to be set in a mode of continuous capture of pictorial information, a second memory unit, and a wireless signaling system for communicating with external devices over a wireless link;
>
> wherein said processing unit in said wearable sensor device is adapted, based on said sensor signals, to send commands over said wireless link by means of one-way transmission to said second digital device to trigger, in response to said commands, storage of at least part of said continuously captured pictorial information in the memory of said at least one second device,
>
> wherein said commands are generated within the wearable sensor device based on sensor signals tracking proximity of a user carrying said wearable sensor device to the second digital device.

2. The system according to claim 1, wherein said wearable sensor device is a sensor module that is detachably attached to an apparel or equipment of a user.

3. The system according to claim 1, wherein said wearable sensor device is a sensor module that is integrated in a garment worn by the user.

4. The system according to claim 1, wherein said wearable sensor device is a sensor module that is integrated in a shoe of the user.

5. The system according to claim 1, wherein said wearable sensor device is a sensor module that is integrated in a sport equipment used by the user.

6. The system according to claim 1, wherein said second digital device is a digital camera.

7. The system according to claim 1, wherein said second digital device is a smartphone equipped with at least one digital camera.

8. The system according to claim 1, wherein said second digital device includes more than one digital camera.

9. The system according to claim 1, wherein said at least one second digital device is adapted to store captured pictorial information as video clips in its memory a predetermined period of time before and/or after having received a storage command.

10. The system according to claim 1, wherein said wearable sensor device has a programming interface enabling a connection to an external computerized device having a user interface for adding and/or modification of computer program instructions and/or parameters for said wearable sensor device, and for storing said instructions and/or parameters in said first memory unit.

11. The system according to claim 10, wherein said external computerized device comprising said programming interface is a mobile phone.

12. The system according to claim 10, wherein said external computerized device comprising said programming interface is a wristop computer.

13. The system according to claim 10, wherein said external computerized device comprising said programming interface is a tabletop computer.

14. The system according to claim 10, wherein said external computerized device comprising said programming interface and said second digital device comprising a recording apparatus are the same device.

15. The system according to claim 14, wherein said external computerized device comprising said programming interface is a wearable digital camera or a mobile phone.

16. The system according to claim 1, wherein said wearable sensor device comprises at least a 3D accelerometer sensor.

17. The system according to claim 1, wherein said wearable sensor device comprises electromagnetic sensors for 3D-detection of the direction of earth's magnetic field.

18. The system of claim 1, wherein both the wearable sensor device and the second digital device have GPS capabilities.

19. The system of claim 1, wherein the proximity is determined based on signal strength sensing.

20. The system of claim 1, wherein said commands are generated within the wearable sensor device without the user needing to manipulate the wearable sensor device.

21. A method of activating a storage operation of pictorial information, comprising the steps of:
providing a wearable sensor device comprising at least one sensor providing sensor signals, a processing unit for running computer programs, a first memory unit for storing instructions for said computer programs and a wireless signaling unit for communicating with external devices over a wireless link;
providing at least one second digital device comprising a recording apparatus adapted to be set to continuous capture of pictorial information, a second memory unit, and a wireless signaling system for communicating with external devices over a wireless link;
producing in said wearable device, based on said sensor signals, commands to instruct storage of pictorial information in said second device;
transmitting by means of one-way transmission said commands over said wireless link to said second device; and
receiving said commands in said at least one second device and triggering in response to said commands storage of at least part of said continuously captured pictorial information in a memory of said at least one second device
wherein said commands are generated within the wearable device based on sensor signals tracking the proximity of a user carrying said wearable sensor device to the second digital device.

22. The method according to claim 21, further comprising the step of storing in said at least one second digital device captured pictorial information as video clips of a predetermined length, wherein each clip is captured a predetermined period of time before and/or after a storage command was issued.

23. The method according to claim 21, further comprising the step of adding and/or modifying computer program instructions and/or parameters through a programming interface in said sensor device with an external computerized device having a user interface for said wearable sensor device, and storing said instructions and/or parameters in said first memory unit.

* * * * *